(12) United States Patent
Tonshal et al.

(10) Patent No.: US 10,633,005 B2
(45) Date of Patent: Apr. 28, 2020

(54) WEARABLE DEVICE CONFIGURATION USING VEHICLE AND CLOUD EVENT DATA

(71) Applicant: Ford Global Technologies, LLC, Dearborn, MI (US)

(72) Inventors: Basavaraj Tonshal, Northville, MI (US); Yifan Chen, Ann Arbor, MI (US); Kwaku O. Prakah-Asante, Commerce Township, MI (US); Padma Aiswarya Kolisetty, Chennai (IN); Hsin-hsiang Yang, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 79 days.

(21) Appl. No.: 15/754,623

(22) PCT Filed: Nov. 3, 2015

(86) PCT No.: PCT/US2015/058752
§ 371 (c)(1),
(2) Date: Feb. 23, 2018

(87) PCT Pub. No.: WO2017/078680
PCT Pub. Date: May 11, 2017

(65) Prior Publication Data
US 2018/0257668 A1    Sep. 13, 2018

(51) Int. Cl.
| G06F 1/16 | (2006.01) |
| B60W 50/14 | (2020.01) |
| B60W 50/08 | (2020.01) |
| G06F 3/0482 | (2013.01) |
| G06F 3/0487 | (2013.01) |
| G07C 5/08 | (2006.01) |

(Continued)

(52) U.S. Cl.
CPC ............ *B60W 50/14* (2013.01); *B60W 50/08* (2013.01); *G06F 1/163* (2013.01); *G06F 3/0482* (2013.01);
(Continued)

(58) Field of Classification Search
CPC ......... B60W 50/14; B60W 2050/0077; B60W 2550/14; B60W 2550/12; B60W 2520/10;
(Continued)

(56) References Cited

U.S. PATENT DOCUMENTS

| 8,947,322 B1 | 2/2015 | Chi et al. |
| 9,037,125 B1 | 5/2015 | Kadous |

(Continued)

OTHER PUBLICATIONS

International Search Report and Written Opinion dated Feb. 2, 2016 re PCT/US2015/58752.

*Primary Examiner* — Shen Shiau
(74) *Attorney, Agent, or Firm* — Brandon Hicks; Bejin Bieneman PLC

(57) ABSTRACT

A system of one or more computers can be configured to perform particular operations or actions by virtue of having software, firmware, hardware, or a combination of them installed on a user device that includes a processor and a memory, the memory storing instructions executable by the processor such that the device is programmed to: send a trigger configuration file to a vehicle computer in a vehicle; receive an indication of a trigger from the vehicle computer; receive an input from a wearable device; and execute a task, based on the input and the trigger. Other embodiments of this aspect include corresponding computer systems, apparatus, and computer programs recorded on one or more computer storage devices, each configured to perform the actions of the methods.

16 Claims, 3 Drawing Sheets

(51) Int. Cl.
*H04W 4/02* (2018.01)
*B60W 50/00* (2006.01)

(52) U.S. Cl.
CPC ......... *G06F 3/0487* (2013.01); *G07C 5/0816* (2013.01); *H04W 4/023* (2013.01); *B60W 2050/0064* (2013.01); *B60W 2050/0077* (2013.01); *B60W 2050/146* (2013.01); *B60W 2520/10* (2013.01); *B60W 2540/10* (2013.01); *B60W 2540/12* (2013.01); *B60W 2540/18* (2013.01); *B60W 2550/12* (2013.01); *B60W 2550/14* (2013.01); *B60W 2550/20* (2013.01); *B60W 2550/40* (2013.01)

(58) Field of Classification Search
CPC ....... B60W 2540/12; B60W 2050/146; B60W 2050/0064; B60W 2540/10; B60W 2550/20; B60W 50/08; B60W 2540/18; B60W 2550/40; G06F 3/0487; G06F 1/163; G06F 3/0482; H04W 4/023; G07C 5/0816
See application file for complete search history.

(56) References Cited

U.S. PATENT DOCUMENTS

| | | | |
|---|---|---|---|
| 9,532,200 B2* | 12/2016 | Yae | H04W 4/16 |
| 9,542,781 B2* | 1/2017 | Hatton | G07C 5/0816 |
| 9,630,496 B2* | 4/2017 | Cuddihy | B60N 2/002 |
| 10,019,070 B2* | 7/2018 | Szczerba | G06F 3/016 |
| 2014/0049487 A1 | 2/2014 | Konertz et al. | |
| 2014/0306799 A1* | 10/2014 | Ricci | H04W 4/21 340/5.83 |
| 2014/0306817 A1* | 10/2014 | Ricci | G05D 1/0016 340/457 |
| 2014/0309789 A1* | 10/2014 | Ricci | H04W 4/40 700/276 |
| 2014/0309806 A1* | 10/2014 | Ricci | B60R 25/1004 701/1 |
| 2014/0309864 A1* | 10/2014 | Ricci | A61B 5/0077 701/36 |
| 2014/0309874 A1* | 10/2014 | Ricci | G06F 21/31 701/36 |
| 2014/0309885 A1* | 10/2014 | Ricci | H04W 4/21 701/41 |
| 2015/0091780 A1 | 4/2015 | Lyren | |
| 2015/0145653 A1 | 5/2015 | Katingari et al. | |
| 2015/0177939 A1 | 6/2015 | Anderson et al. | |
| 2015/0232065 A1* | 8/2015 | Ricci | H04W 4/21 701/36 |
| 2015/0312404 A1 | 10/2015 | Abramson et al. | |
| 2016/0280067 A1* | 9/2016 | Cuddihy | G08B 21/02 |
| 2016/0335817 A1* | 11/2016 | Hatton | G07C 5/0816 |
| 2016/0358453 A1* | 12/2016 | Wassef | G08B 25/016 |
| 2017/0123503 A1* | 5/2017 | Szczerba | B60R 16/023 |
| 2018/0009316 A1* | 1/2018 | Dadoosh | B60K 37/02 |
| 2018/0286150 A1* | 10/2018 | Chen | B60W 50/14 |

* cited by examiner

WEARABLE DEVICE CONFIGURATION USING VEHICLE AND CLOUD EVENT DATA

CROSS-REFERENCE TO RELATED APPLICATIONS

This application is a national stage of, and claims priority to, Patent Cooperation Treaty Application No. PCT/US2015/058752, filed on Nov. 3, 2015, which application is hereby incorporated herein by reference in its entirety.

BACKGROUND

A wearable device is a computer that is incorporated into items of clothing and/or accessories, e.g., bracelets, pendants, etc., and typically can comfortably be worn on the human body. Generally, wearable devices have some form of communications capability, e.g., Bluetooth or the like, and will allow the wearer access to local and global computers via a wired or, usually, a wireless, network. Data-input capabilities are also a feature of such devices. Examples of wearable devices include watches, glasses, contact lenses, e-textiles and smart fabrics, headbands, beanies and caps, jewelry such as rings, bracelets and hearing aid-like devices.

DRAWINGS

DESCRIPTION

Introduction

Figure 1:
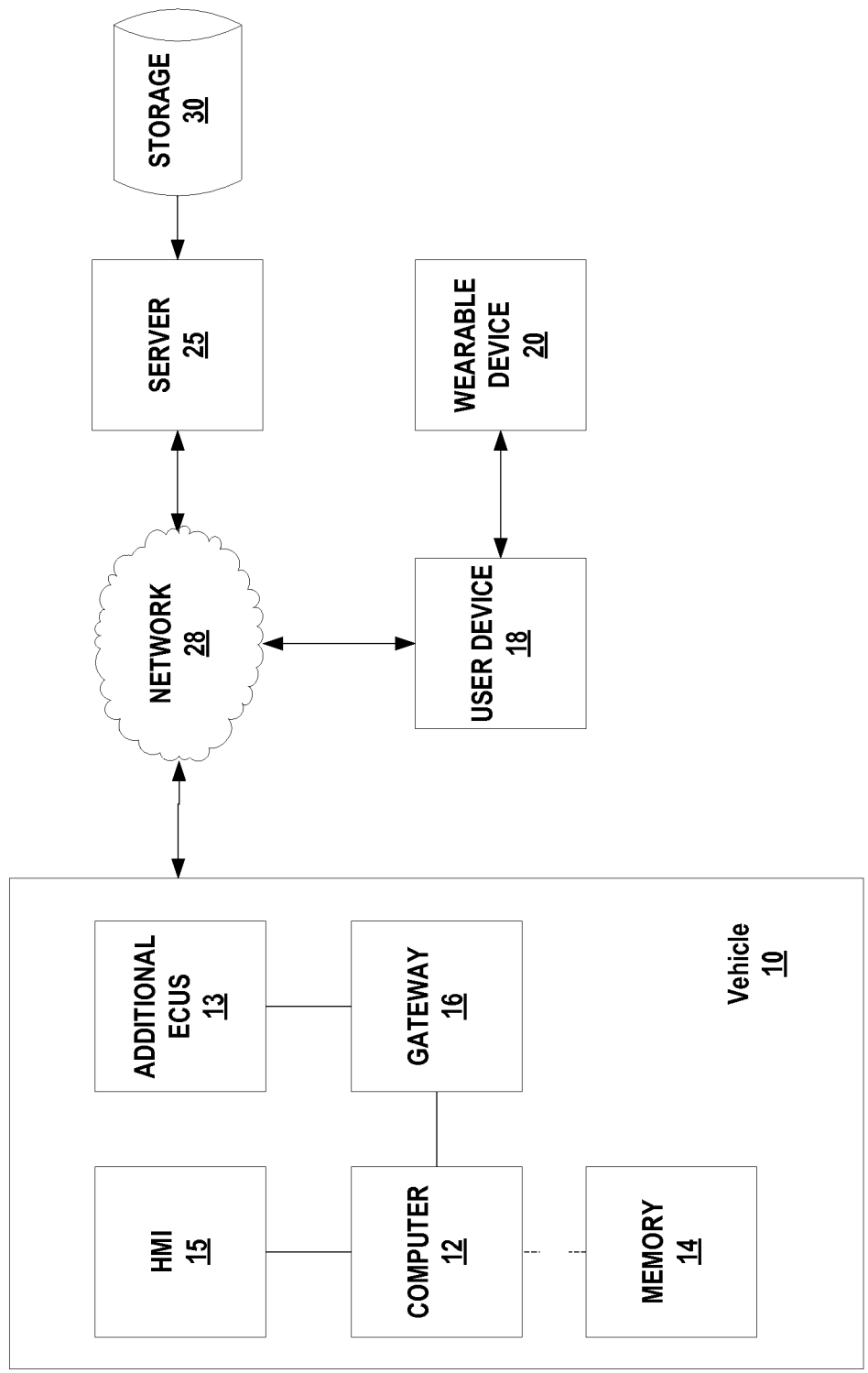
FIG. 1 is a block diagram of an exemplary event and reporting wearable device system.

FIG. 1 is a block diagram of an exemplary event and reporting wearable device system 100. A vehicle 10 includes a computer 12 that communicates through a user device 18 with a wearable device 20, which can be worn by the vehicle 10 occupant, including the vehicle 10 operator. The wearable device 20 is typically a watch or a smartphone, but can also be a pair of glasses, a glove, a contact lens, a smart fabric, a headband, a beanie, a cap, a ring, a bracelet, an in-ear device, or the like, such as is known for various applications, including acting as an external human-machine interface (HMI) to the computer 12.

The computer 12 of a vehicle 10 reports a trigger, i.e., an indication that an event has been received in the vehicle 10 and/or at a vehicle component of the vehicle 10, such as brakes, throttle, steering wheel, etc. to a user device 18 acting as an intermediary. The wearable device 20 can then receive an input indication, such as an activation of a switch on the wearable device 20, and send the user device 18 an input indication signal. The user device 18, based upon a list of triggers and a list of input indication signals, can then send an appropriate message to a human machine interface of the vehicle 10, a HMI of the user device 18, a HMI of the wearable device 20 or even alert the occupant or another by sending a text, an email to an email address, or the like.

Exemplary System Elements

Vehicle

The vehicle 10 includes the vehicle computer 12 that includes a processor and a memory 14, the memory 14 including one or more forms of computer-readable media. The memory 14 stores instructions executable by the processor for performing various operations, including as disclosed herein. For example, the computer 12 generally includes instructions such that it is programmed to identify events and to provide a message concerning an event, e.g., to the user device 18. The computer 12 is further generally programmed to detect the presence(s) of the user device 18 and the wearable device 20. Accordingly, the computer 12 can provide to or receive from the user device 18 and/or the wearable device 20 files and messages that additionally are, or otherwise would be, sent to the human machine interface (HMI) 15. The user device 18, as explained further below, in its role as an intermediary between the computer 12 and the wearable device 20, can receive data concerning one or more triggers from the computer 12 and an input signal from the wearable device 20, and determine whether a message is to be provided to the wearable device 20, the user device 18, the vehicle 10, or to an external network, and, if so, the form (e.g., haptic output, visual output instructions, text message, e-mail, etc.) of such a message as well as its content (e.g., vibration indicating a danger situation, text display indicating vehicle 10 speed, etc.)

The computer 12 is configured, i.e., includes programming and hardware such as is known, for communicating with one or more servers 25 with a data store 30 via the vehicle 10 gateway 16. The gateway 16 can be a telematics unit or the like which accommodates sending and receiving information via an external network 28. The wearable device 20, the user device 18, and the vehicle 10 gateway 16 can communicate with each other, as described below, and may include various wired and/or wireless networking technologies, e.g., cellular, Wi-Fi, Bluetooth, Near Field Communication (NFC), wired and/or wireless packet networks, etc. Further, the computer 12 generally includes instructions for exchanging data, e.g., from one or more wearable devices 20 and/or user devices 18 and/or the HMI 15, which may be one or more of an interactive voice response (IVR) system, a graphical user interface (GUI) including a touchscreen or the like, etc.

The vehicle 10 can have an additional electronic control units (ECUs) 13 for monitoring and controlling various vehicle 10 electrical and electromechanical systems. The ECUs can be incorporated into the vehicle 10 and provide and request information to and from the occupant via the HMI 15, the wearable device 20, or the user device 18. For example, ECUs 13 can represent a navigation ECU which provides a vehicle navigation system location. Other ECUs can include a safety ECU, a powertrain ECU, an entertainment ECU, just to name a few. The ECU 13 can contain a processor and a memory with instructions to be executed on the processor to perform each particular ECU's operation(s), as well as instructions on how to communicate with other ECUs and devices.

Wearable Device

The wearable device 20 is typically a device worn or carried by a user and may be any one of a variety of computing devices which includes a processor and a memory as well as having radio frequency and/or wired communication capabilities. A concern of wearable device 20 is the size of the battery and how long the wearable will operate before needing a battery recharge or replacement. If the battery is large, the wearable device may be heavy, awkward to wear, or unsightly. To obtain a reasonable operational time, while incorporating a less obtrusive battery, the wearable device 20 will usually contain a low power processor and a low power communications circuit. The low power communication circuit of the wearable device 20 may only be able to communicate with other devices within a very short range. For example, due to a very low radio frequency transmitter, the wearable device 20 may only be capable of reliably communicating with the occupant's user device 18 when the wearable device 20 is within one meter of the user device 18. Therefore, the wearable device 20 could need to first establish a connection with the user device 18, and the user device 18 may then handle the communications with the vehicle 10 computer 12. In other words, a program executing on the user device 18 permits the user device 18 to act as an intermediary between the wearable device 20 and the vehicle 10 computer 12.

In addition, the wearable device 20 may have a low power geolocation hardware and software circuitry to provide a wearable device location. For example, the wearable device 20 can report its location independently of the vehicle 10 navigation location or the user device 18 location. The wearable device 20 location can then be used to verify that the wearer of the wearable device 20 is within the vehicle 10 and has not wandered away from the vehicle 10. In one example after a wearable device 20 is not verified to be within, or within a predetermined distance of, a vehicle 10, a location alert message can be sent to a concerned parent or child, e.g., to a user device 18.

Furthermore, the wearable device 20 can be used to supplement and/or replace the HMI 15 of the vehicle 10. The wearable device 20 can exchange, i.e. send and/or receive messages with the user device 18 and the user device 18 can exchange messages with the vehicle 10 computer 12. For example, the computer 12 may generate an alert that is sent to the user device 18. The user device 18 can determine whether to send a message concerning the alert to the wearable device 20. Further, for example, the user device 18 can include a query or a request in the message sent to the wearable device 20 prompting for user input in response to the alert. The wearer of the wearable device 20 can then press a button or provide other input, which will then send a response to the user device 18. In another example, the mere detection of the wearable device 20 within the vehicle 10 and proximate to the user device 18 can be considered as if a button was physically activated on the wearable device 20 by a communications connection, e.g., the establishment of a Bluetooth connection.

User Device

The user device 18 can be a smartphone, a tablet, or the like with a telecommunications connection to an external cellular network, as well as local network capability. For example, the user device 18 can be connected to a telephone network for voice communications as well as having a data connection to an external network, such as the Internet. The local network capability can be provided by WiFi, Bluetooth, Near Field Communication, etc. The user device 18 can include geolocation hardware and software, which allows the device to obtain positional information and provide a user device location.

The user device 18, typically a mobile device carried by a user, may be any one of a variety of computing devices with a processor and a memory, as well as a communication circuit. For example, the user device 18 may be a portable computer, a tablet computer, a smart phone, etc., that includes capabilities for wireless communications using IEEE 802.11, Bluetooth, and/or cellular communications protocols. Further, the user device 18 may use such communication capabilities to communicate, e.g., via a direct connection such a Bluetooth or the like and/or via the network 28 with the vehicle computer 12 and the wearable device 20. Accordingly, the user device 18 may be used to carry out some of the operations herein such as receiving environmental data from a server 25, making a determination to alert the driver of an impending storm and possible flooded roadways, and providing and determining an alternative route for the vehicle 10. Further, the user device 18 could be used to supplement and/or replace the HMI 15 of the vehicle 10.

Figure 2:
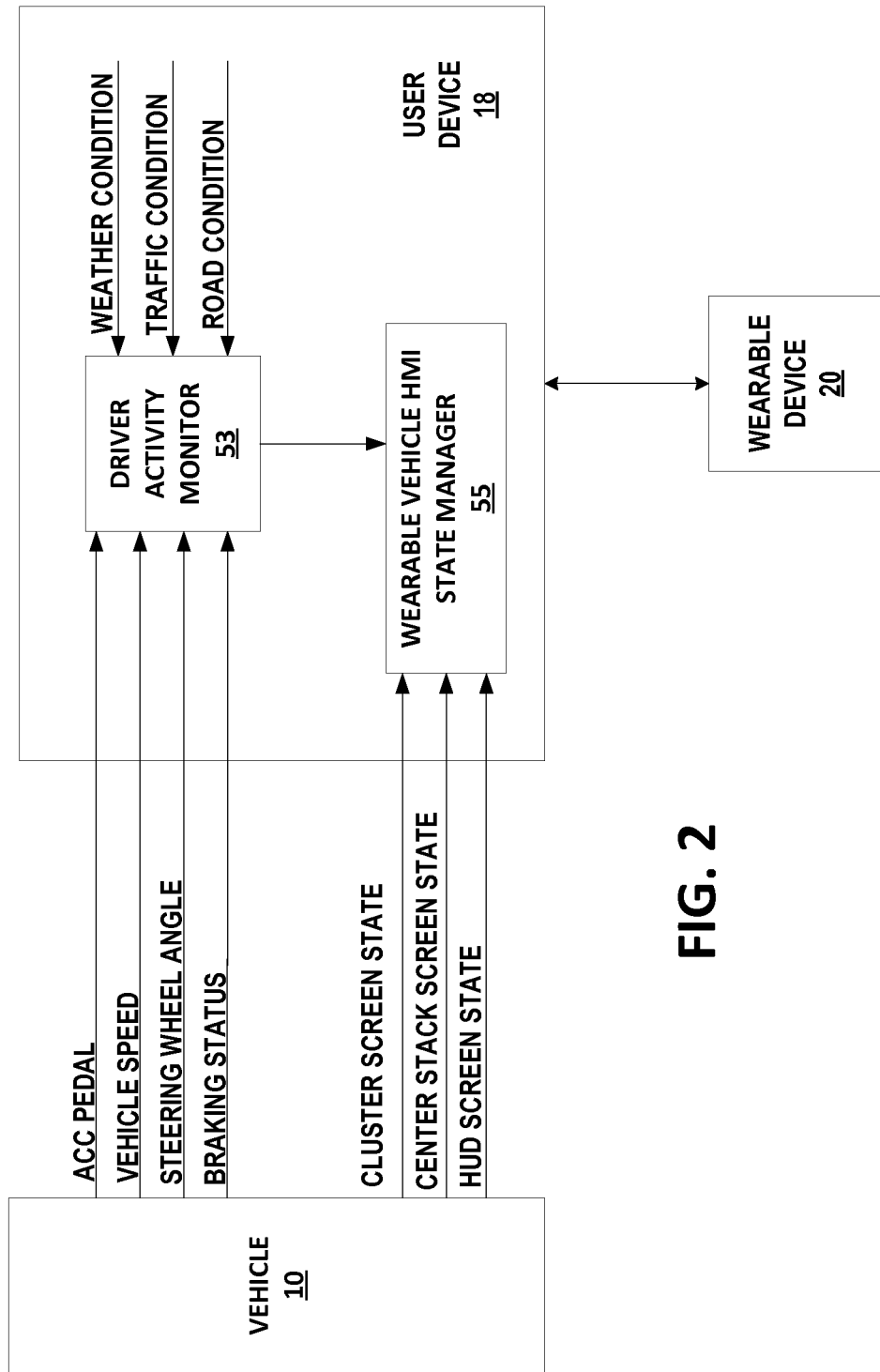
FIG. 2 is a block diagram of an exemplary wearable device of the system of FIG. 1.

FIG. 2 is a block diagram of an exemplary user device 18 intermediating between the vehicle 10 and wearable device 20 with the capability to receive external condition information and vehicle 10 status information and send a wearable status message to the wearable device 20. As discussed above, wearable devices can have limited computing and communications abilities. Therefore, software programs, such as a smartphone app or the like, permit the user device 18 to act as an intermediary between the vehicle 10 and the wearable device 20. The vehicle 10 can send various driver activity signals, i.e., events as described above, to the user device 18. For example, an accelerator (ACC) pedal position, a vehicle speed value, a steering wheel angle, a vehicle health status, etc. may each generate an event, e.g., when a vehicle speed exceeds a predetermined threshold, e.g., a certain value in miles or kilometers per hour, a certain threshold over a speed limit determined by consulting a vehicle 10 navigation system, etc. The ACC pedal position is typically known as a "drive by wire" system and will deliver information to the engine control ECU 13 about the accelerator pedal position in addition to the information about the speed at which the driver is pushing on the gas pedal. In another example, the vehicle 10 can send the vehicle health status to the user device 18 indicating the vehicle 10 is having issues with one or more systems. The user device 18 can then alert the operator of the wearable device 20 of the vehicle health status. The user device 18 can then query the operator via the wearable device 20 if the vehicle 10 health status should be uploaded to a vehicle service facility via the Internet. The operator can just acknowledge the upload by interacting with the HMI of the wearable device 20. Furthermore, the user device 18 can even negotiate a service appointment with the vehicle service facility and send proposed dates and times to the wearable device 20 HMI, allowing the operator to select a date and time that is acceptable. The user device 18 can then confirm the service appointment with the service facility.

The aforementioned driver activity signals permit the computer 12 and/or user device 18 to determine a driver activity index, i.e., a value representing driver activity. Each of the activities can be quantified with a number. For example, if the driver is pressing on the accelerator to go faster, that action can be represented with a first factor driver activity number, which can be relatively higher as compared to the next discussed pedal positions. A midrange number would represent the driver holding a steady speed with the accelerator pedal. Likewise, if the driver is not engaging the accelerator pedal, the driver activity number for the ACC driver activity would be lower. The vehicle speed can also determine a second factor driver activity number, e.g., the faster the vehicle 10 is traveling, the higher the second factor driver activity number. An amount a steering wheel is turned is a third factor driver activity number that may be considered in quantifying driver activity in the driver activity index. The more the steering wheel is turned in one example, the higher the third factor driver activity number. The first, second, and third factor driver activity numbers are then aggregated, e.g., added or averaged, to determine an overall driver activity number. For example, the user device 18 ascertains that the ACC pedal position indicates the driver is accelerating the vehicle through ACC pedal engagement, the vehicle 10 speed value is 55 miles per hour and the steering wheel position is indicating a turn, the user device 18 can determine that a driver is actively engaged in driving the vehicle and the user device 18 can suppress notifications either the user device 18 or the wearable device 20.

The computer 12 may provide one or more of a vehicle state data, which can contain a cluster screen state, a center stack screen state and a heads up display (HUD) state. The cluster screen state is a set of instrument data usually present on the dashboard of the vehicle 10, e.g. a speedometer and tachometer. The center stack screen state is a set of vehicle control data usually present in the center stack of the vehicle 10, e.g., radio, environmental, navigation, etc. The HUD state is a set of HUD data which may be projected upon the windshield in front of the operator, e.g., a current speed limit, a vehicle speed of the vehicle 10, etc.

In addition, the user device 18 and/or computer 12 can acquire environmental condition data as it relates to the vehicle 10 and its journey. For example, the user device 18 can request and obtain a set of environmental conditions with regards to weather condition information, traffic condition information, and road condition information. For example, the set of environmental conditions can be requested by the mobile device 18 from the server 25, which may be on the Internet. The user device 18 can then determine an event based on the environmental conditions, e.g., because a predicted likelihood and/or intensity of precipitation is above a predetermined threshold, e.g., an 80% or higher likelihood of rain; a prediction that an accumulation of precipitation, e.g., rain or snow within a predetermined time in a region of vehicle 10 travel, will exceed a certain threshold; etc. Based on such event, the user device 18 can be programmed to alert the driver of the environmental conditions either through the user device 18 and/or the wearable device 20. For example, an audio or visual message could be displayed on the user device 20 and the user could be prompted to provide an input, e.g., pressing a soft or hard button, to acknowledge the message.

The network 28 represents one or more mechanisms by which a vehicle 10 computer 12 may communicate with a server 25 and/or a user device 18. Accordingly, the network 28 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN), and/or wide area networks (WAN), including the Internet, providing data communication services.

The server 25 may be one or more computer servers, each generally including at least one processor and at least one memory, the memory storing instructions executable by the processor, including instructions for carrying out various steps and processes described herein. In general, the server 25 may be used for a variety of purposes, e.g., interacting with a vehicle 10 navigational system, providing data used for suggesting a vehicle 10 route and/or attributes thereof. The server 25 may include or be communicatively coupled to a data store 30 for storing data such as route information, potential waypoints, weather and traffic information, etc. Thus, one possible operation of the server 25 in the system 100 is to receive an indication from a vehicle 10 computer 12 via the network 28 that a vehicle 10 occupant is in the vehicle 10, and that the vehicle 10 is on.

Exemplary Process Flows

Figure 3:
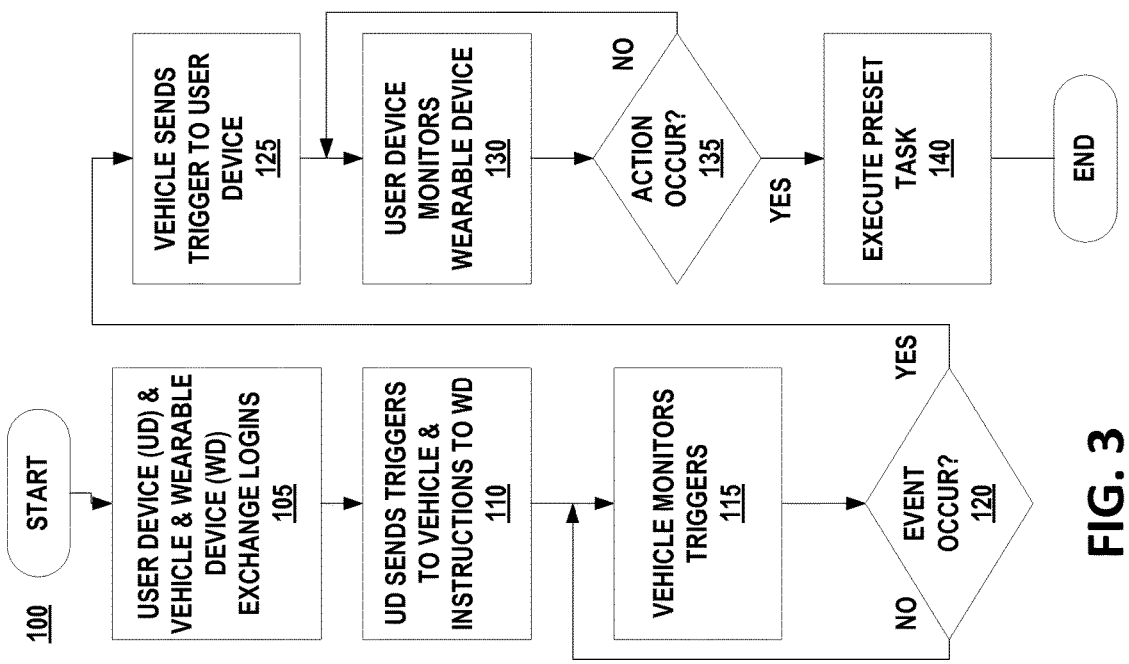
FIG. 3 is a diagram of an exemplary process for initializing, monitoring vehicle events, and executing a task when a message is received from the wearable device.

FIG. 3 is a diagram of an exemplary process 100 for initializing and monitoring one or more events and for obtaining input via a wearable device 20, whereupon a task may be executed, e.g., upon receipt of user input to a wearable device 20, a simple message service (SMS) message or the like may be sent to one or more recipients; e.g., based on a trigger from a vehicle 10 navigation system indicating that travel time is slower than usual, a SMS message may be sent to the wearable device 20 wearer's spouse indicating the delay.

The process 100 begins in a block 105, in which the user device 18 exchanges login credentials with the wearable device 20 and with the vehicle 10 computer 12. For example, a user who is wearing the wearable device 20 may be prompted to provide an input to the user device 18, e.g., via a smartphone app or the like, to initiate the exchange of login communications between the wearable device 20 and the user device 18.

Next, in a block 110, the device 18 sends a trigger configuration file to the vehicle 10 computer 12. The trigger configuration file contains triggers that the user device 18 wants the vehicle 10 to monitor and report when the trigger occurs. For example, an ignition state, when the vehicle 10 is moving, an accelerator pedal position value, a vehicle health state, a steering wheel angle, etc., may be monitored and reported. Alternatively, the user device 18 can instruct the vehicle 10 to download the trigger configuration file from the server 25 on the network 28.

Additionally, the device 18 sends a wearable device configuration to the wearable device 20. The wearable device configuration can include a menu of tasks which are functions that the wearable device 20 can execute. For example, the wearable device 20 can be programmed with a "Help, I am lost" function or an "I am on my way" function. These functions can be programmed to a hard key, a soft key, a graphical user interface (GUI) interface, etc. For example, hard key and/or soft key programming associates a specific input on the wearable device 20, e.g., a soft key and/or a hard key with a specific user response E.g., soft key programming associated with a "travel time delayed" event could include programming to send a message to a designated recipient upon selection of the soft key, e.g., an SMS message informing a spouse of the delay. A hard key is a dedicated hardware key, switch, slider, etc., on the wearable device 20. For example, an alert button on the wearable device 20 that can send an emergency request to the user device 18, which in turn can call for emergency services or send a text requesting emergency services at a location of the vehicle 10, as provided by global positioning system (GPS) of the vehicle 10. A soft key is a button flexibly programmable to invoke any of a number of functions rather than being associated with a single fixed function or a fixed set of functions. The GUI of the wearable device 20 can be a LCD display, a LCD display with a touch screen or merely a LED light which can flash different patterns and colors to indicate various statuses of messages to the user. For example, the LED can emit a green light when the vehicle 10 systems are operating normally and a red light when there is a problem with a system or subsystem.

Next, in a block 115, which can also execute after a block 120, the computer 12 monitors the vehicle 10 for an occurrence of one or more triggers, e.g., as specified in the list of triggers. For example, the user could have started the vehicle 10, in which case a change in the ignition state would be reported to the user device 18.

Next, in the block 120, the computer 12 determines if the trigger did occur. If a trigger occurred, next a block 125 is executed; otherwise, the block 115 is executed.

In the block 125, the computer 12 sends a message that the trigger occurred to the user device 18. For example, a "vehicle is moving" event message is sent once the vehicle 10 is in motion or a "vehicle is not moving" when the vehicle 10 stops.

In a block 130, which can follow the block 125 but also can follow a block 135, the user device 18 monitors the wearable device 20 for a wearer device message which is generated when an input to the wearable device 20 occurs.

Next, in the block 135, a determination is made if the wearer device message is received from the wearable device 20. For example, the user could press and activate a soft key button to generate an "I am on my way" wearer device message. If the user device message is received, next a block 140 is executed; otherwise, the system 100 executes in the block 130.

In the block 140, a task is executed based upon the trigger and the wearer device message. For example, continuing with the example from the blocks 125 and 135, the task can be sending a message to a device outside of the vehicle 10. In this example, the trigger indicates that the vehicle 10 is moving and the wearer device message is initiated by the user input into the wearable device 20, whereupon the user device 18 sends the "I am on my way" message to one or more designated recipients. Furthermore, the user device 18 can include a location message in the text or email indicating that the user is in a vehicle and that the vehicle is moving.

The process 100 ends following the block 140.

Figure 4:
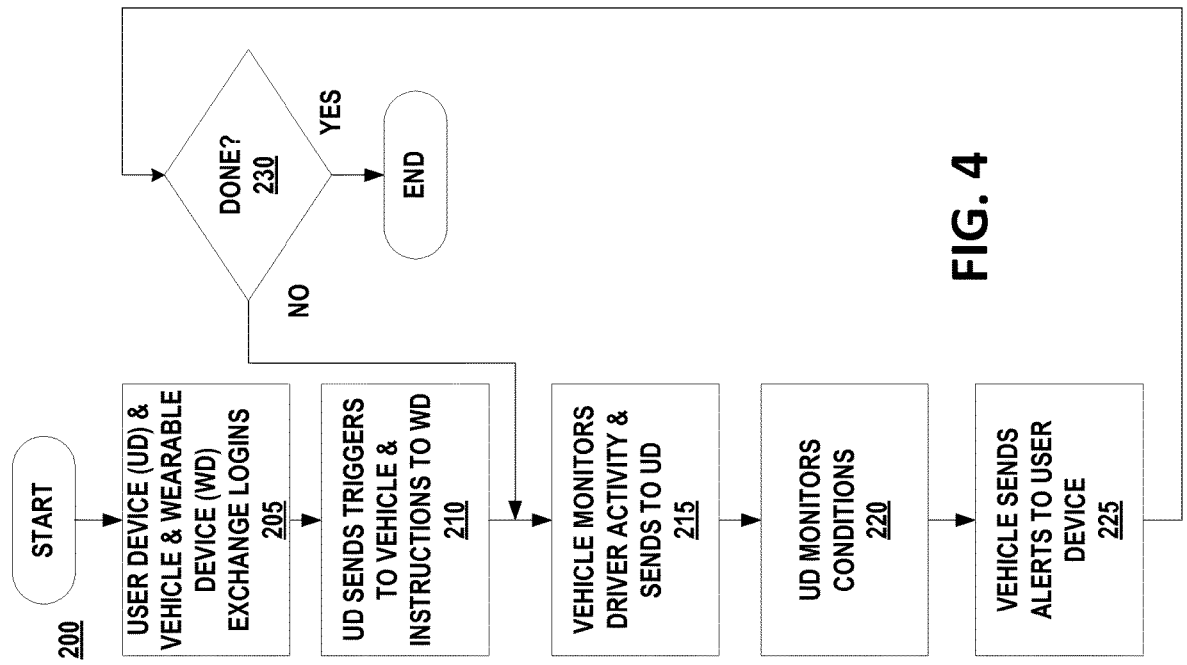
FIG. 4 is a diagram of another exemplary process for monitoring vehicle systems, a set of vehicle screens, and wearable actions.

FIG. 4 is a diagram of another exemplary process 200 for monitoring driver activity and allowing appropriate communications of the wearable device 20.

The process 200 begins in a block 205, which is similar to the block 105. Further, a block 210, following the block 205, is likewise similar to the block 110 described above.

Following the block 210, in a block 215, which can follow the blocks 210 or 230, the vehicle 10 reports occurrences of events, if any, to the computer of the user device 18 from the list of triggers. For example, an ignition state, when the vehicle is moving, an accelerator pedal position value, a vehicle health state, a steering wheel angle, etc., may be monitored and reported.

Next in a block 220, the user device 18 receives an environmental condition report. For example, the report can include a weather condition, a traffic condition, and a road condition related to the locale the vehicle is located.

Next in a block 225, the user device 18 can send an alert message to the wearable device 20 based upon the list of triggers; the states of the cluster screen, center console, and the HUD; and the environmental conditions. For example, the user device 18 receives information from the vehicle 10 that the vehicle 10 is traveling at a high rate of speed. The computer of the user device 18 also receives a weather condition report that a severe storm is in the path of travel of the vehicle 10. The computer of the user device 18 can send a message containing a travel report to the wearable device 20. The message can include an alert which can be an audible alert, a haptic vibration, and/or an on-screen message on the wearable device 20 display.

Next, in a block 230 the computer of the user device 18 determines whether the process 200 is complete. If so, the process 200 ends; otherwise, the process 200 returns to in the block 215.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Computing devices such as those discussed herein generally each include instructions executable by one or more computing devices such as those identified above, and for carrying out blocks or steps of processes described above. For example, process blocks discussed above are embodied as computer-executable instructions.

Computer-executable instructions may be compiled or interpreted from computer programs created using a variety of programming languages and/or technologies, including, without limitation, and either alone or in combination, Java™, C, C++, C #, Visual Basic, Java Script, Python, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A user device that includes a processor and a memory, the memory storing instructions executable by the processor such that the device is programmed to:
   send a trigger configuration file to a vehicle computer in a vehicle, the trigger configuration file containing a trigger for the vehicle computer to report occurrences of, the trigger configuration file instructing the vehicle computer to report occurrences of the trigger to the user device in response to the trigger occurring as specified in the trigger configuration file;
   receive an indication of the trigger from the vehicle computer;
   receive an input from a wearable device; and
   execute a task in response to receiving the indication, based on the input and the trigger.

2. The device of claim 1, wherein the trigger includes at least one of an accelerator pedal position value, an ignition state, a vehicle speed, a vehicle health status and a steering wheel angle.

3. The device of claim 1, further programmed to send a menu of tasks to the wearable device; and instruct the wearable device to display the menu of tasks on a human machine interface (HMI) of the wearable device.

4. The device of claim 1, wherein the wearable device is at least one of a watch, a smart phone, a pair of glasses, a glove, a contact lens, a smart fabric, a headband, a beanie, a cap, a ring, a bracelet, and an in-ear device.

5. The device of claim 1, wherein the task sends a message to another device outside of the vehicle.

6. The device of claim 5, further programmed to determine a location of the vehicle using at least a user device location, a vehicle navigation system location and a wearable device location; and execute the task based in part the location of vehicle, the input from the wearable device and the trigger.

7. The device of claim 5, further programmed to:
   receive environmental data that includes at least one of a weather condition information, a traffic condition information and a road condition information; and
   execute the task with the message based in part on the environmental data.

8. The device of claim 5, further programmed to:
   receive vehicle state data that includes at least one of a cluster screen state, a center stack screen state, and a vehicle heads up display (HUD) state; and
   execute the task with the message based in part on vehicle state data.

9. A method comprising:
   sending a trigger configuration file to a vehicle computer in a vehicle, the trigger configuration file containing a trigger for the vehicle computer to report occurrences of, the trigger configuration file instructing the vehicle computer to report occurrences of the trigger in response to the trigger occurring as specified in the trigger configuration file;
   receiving an indication of the trigger from the vehicle computer;
   receiving an input from a wearable device; and
   executing a task in response to receiving the indication, based on the input and the trigger.

10. The method of claim 9, wherein the trigger includes at least one of an accelerator pedal position value, an ignition state, a vehicle speed, a vehicle health status and a steering wheel angle.

11. The method of claim 9, further comprising sending a menu of tasks to the wearable device; and instruct the wearable device to display the menu of tasks on a human machine interface (HMI) of the wearable device.

12. The method of claim 9, wherein the wearable device is at least one of a watch, a smart phone, a pair of glasses, a glove, a contact lens, a smart fabric, a headband, a beanie, a cap, a ring, a bracelet, and an in-ear device.

13. The method of claim 9, wherein the task sends a message to another device outside of the vehicle.

14. The method of claim 13, further comprising determining a location of the vehicle using at least a user device location, a vehicle navigation system location and a wearable device location; and execute the task based in part the location of vehicle, the input from the wearable device and the trigger.

15. The method of claim 13, further comprising:
   receiving environmental data that includes at least one of a weather condition information, a traffic condition information and a road condition information; and
   executing the task with the message based in part on the environmental data.

16. The method of claim 13, further comprising:
   receiving vehicle state data that includes at least one of a cluster screen state, a center stack screen state, and a vehicle heads up display (HUD) state; and
   executing the task with the message based in part on the vehicle state data.

* * * * *